United States Patent
Takemura et al.

(10) Patent No.: US 11,282,386 B2
(45) Date of Patent: Mar. 22, 2022

(54) PARKING LOT MANAGEMENT DEVICE, PARKING LOT MANAGEMENT METHOD, AND NON-TRANSITORY STORAGE MEDIUM

(71) Applicant: TOYOTA JIDOSHA KABUSHIKI KAISHA, Toyota (JP)

(72) Inventors: Kazuaki Takemura, Nagoya (JP); Makoto Matsushita, Ichinomiya (JP); Tae Sugimura, Miyoshi (JP); Hideo Hasegawa, Nagoya (JP); Tomoaki Umeki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/818,386

(22) Filed: Mar. 13, 2020

(65) Prior Publication Data
US 2020/0327808 A1 Oct. 15, 2020

(30) Foreign Application Priority Data
Apr. 11, 2019 (JP) .............................. JP2019-075341

(51) Int. Cl.
*G08G 1/14* (2006.01)
*G08G 1/16* (2006.01)
*G06K 9/00* (2006.01)
*G08G 1/017* (2006.01)

(52) U.S. Cl.
CPC ......... *G08G 1/146* (2013.01); *G06K 9/00785* (2013.01); *G08G 1/0175* (2013.01); *G08G 1/142* (2013.01); *G08G 1/168* (2013.01); *G06K 2209/23* (2013.01)

(58) Field of Classification Search
CPC ...... G08G 1/146; G08G 1/0175; G08G 1/142; G08G 1/168; G06K 9/00785; G06K 2209/23
See application file for complete search history.

(56) References Cited

U.S. PATENT DOCUMENTS

| | | | |
|---|---|---|---|
| 10,043,390 B2 * | 8/2018 | Chang | G08G 1/148 |
| 2017/0092130 A1 * | 3/2017 | Bostick | G08G 1/144 |
| 2017/0263124 A1 * | 9/2017 | Li | G08G 1/096816 |
| 2018/0046198 A1 * | 2/2018 | Nordbruch | G05D 1/0282 |
| 2018/0341274 A1 * | 11/2018 | Donnelly | G01C 21/3492 |
| 2019/0063947 A1 * | 2/2019 | Beaurepaire | G01C 21/3476 |
| 2020/0132502 A1 * | 4/2020 | Beaurepaire | G01C 21/3602 |

FOREIGN PATENT DOCUMENTS

| | | | |
|---|---|---|---|
| CN | 105551301 A | 5/2016 | |
| CN | 108711300 A | 10/2018 | |
| JP | 2005-084719 A | 3/2005 | |
| JP | 2018156641 A | * 10/2018 | ............... G08G 1/09 |

* cited by examiner

*Primary Examiner* — Mohamed Barakat
(74) *Attorney, Agent, or Firm* — Oliff PLC

(57) ABSTRACT

A parking lot management device includes a memory and a processor including hardware. The processor is configured to identify a plurality of vehicles which enters a parking lot by analyzing an image which is captured at an entrance of the parking lot, to select parking positions which are different in the parking lot and in which moving routes from the entrance of the parking lot to the parking positions do not interfere with movement and parking of other vehicles in the parking lot for the plurality of vehicles, and to transmit the selected parking positions and the moving routes to the parking positions to the plurality of vehicles.

8 Claims, 12 Drawing Sheets

PARKING LOT MANAGEMENT DEVICE, PARKING LOT MANAGEMENT METHOD, AND NON-TRANSITORY STORAGE MEDIUM

INCORPORATION BY REFERENCE

The disclosure of Japanese Patent Application No. 2019-075341 filed on Apr. 11, 2019 including the specification, drawings and abstract is incorporated herein by reference in its entirety.

BACKGROUND

1. Technical Field

The disclosure relates to a parking lot management device, a parking lot management method, and a non-transitory storage medium.

2. Description of Related Art

Japanese Patent Application Publication No. 2005-84719 (JP 2005-84719 A) discloses a parking lot management device that guides a vehicle entering a parking lot to an empty parking position and warns a vehicle which is going to park at an erroneous parking position using a warning device.

SUMMARY

In the parking lot management device disclosed in JP 2005-84719 A, a vehicle entering a parking lot is guided to an empty parking position and a moving route to the parking position is arbitrary. Accordingly, for example, when a plurality of vehicles enters the parking lot at the same time, moving routes to parking positions of the vehicles may overlap each other and congestion may occur in the parking lot.

The disclosure provides a parking lot management device, a parking lot management method, and a non-transitory storage medium that can resolve congestion in a parking lot.

According to the disclosure, there is provided a parking lot management device including a memory and a processor that includes hardware. The processor is configured to identify a plurality of vehicles which enters a parking lot by analyzing an image which is captured at an entrance of the parking lot, to select parking positions which are different in the parking lot and in which moving routes from the entrance of the parking lot to the parking positions do not interfere with movement and parking of other vehicles in the parking lot for the plurality of vehicles, and to transmit the selected parking positions and the moving routes to the parking positions to the plurality of vehicles.

Accordingly, the parking lot management device guides a plurality of vehicles which enters a parking lot to parking positions which do not interfere with movement and parking of other vehicles along moving routes to the parking positions.

In the parking lot management device according to the disclosure, the processor may be configured to select parking positions in which moving routes from the entrance of the parking lot to the parking positions do not overlap moving routes of other vehicles in the parking lot and which do not interfere with parking spaces of other vehicles in the parking lot for the plurality of vehicles.

Accordingly, the parking lot management device guides a plurality of vehicles which enters a parking lot to parking positions which do not overlap moving routes of other vehicles and which do not interfere with parking spaces of other vehicles along moving routes to the parking positions.

In the parking lot management device according to the disclosure, the moving routes of other vehicles in the parking lot may include a moving route on which a vehicle entering the parking lot moves from the entrance of the parking lot to a parking position thereof and a moving route on which a vehicle exiting the parking lot moves from a parking position thereof to an exit of the parking lot.

Accordingly, the parking lot management device guides a plurality of vehicles which enters a parking lot to parking positions which do not interfere with moving routes of other vehicles entering the parking lot and other vehicles exiting the parking lot along moving routes to the parking positions.

In the parking lot management device according to the disclosure, the processor may be configured to monitor positions of the vehicles in the parking lot based on position information which is input from the plurality of vehicles and to transmit warning information to a vehicle which is going to park at a parking position which is different from the transmitted parking position.

Accordingly, the parking lot management device warns a vehicle which is going to park at an erroneous parking position and prompts the vehicle to park at a correct parking position.

In the parking lot management device according to the disclosure, the processor may be configured to set scores for parking positions in the parking lot based on a preset criterion and to select the parking positions with higher scores for the plurality of vehicles in the order of entering the parking lot.

Accordingly, the parking lot management device notifies a plurality of vehicles which enters a parking lot of parking positions which are selected based on scores of parking positions in the parking lot.

According to the disclosure, there is also provided a parking lot management method which is performed by a parking lot management device, the parking lot management method causing a processor of the parking lot management device to perform: identifying a plurality of vehicles which enters a parking lot by analyzing an image which is captured at an entrance of the parking lot; selecting parking positions which are different in the parking lot and in which moving routes from the entrance of the parking lot to the parking positions do not interfere with movement and parking of other vehicles in the parking lot for the plurality of vehicles; and transmitting the selected parking positions and the moving routes to the parking positions to the plurality of vehicles.

Accordingly, the parking lot management method enables a plurality of vehicles which enters a parking lot to be guided to parking positions which do not interfere with movement and parking of other vehicles along moving routes to the parking positions.

According to the disclosure, there is also provided a non-transitory storage medium storing instructions that are executable by one or more processors and that cause the one or more processors to perform functions including: identifying a plurality of vehicles which enters a parking lot by analyzing an image which is captured at an entrance of the parking lot; selecting parking positions which are different in the parking lot and in which moving routes from the entrance of the parking lot to the parking positions do not interfere with movement and parking of other vehicles in the parking lot for the plurality of vehicles; and transmitting the selected parking positions and the moving routes to the parking positions to the plurality of vehicles.

Accordingly, the non-transitory storage medium enables a plurality of vehicles which enters a parking lot to be guided to parking positions which do not interfere with movement and parking of other vehicles along moving routes to the parking positions.

According to the disclosure, since a plurality of vehicles which enters a parking lot is guided to parking positions which do not interfere with movement and parking of other vehicles along moving routes to the parking positions, it is possible to resolve congestion in the parking lot.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A parking lot management device, a parking lot management method, and a parking lot management program according to an embodiment will be described below with reference to the accompanying drawings. Elements in the following embodiment include elements which can be easily substituted by those skilled in the art or elements which are substantially the same.

Parking Lot Management System

The whole configuration of a parking lot management system to which a parking lot management device according to an embodiment can be applied will be described below with reference to FIG. 1. The parking lot management system includes a parking lot server 1, imaging devices 2a and 2b, and a plurality of vehicles 3. The parking lot management device according to this embodiment is specifically realized by the parking lot server 1.

The parking lot server 1, the imaging devices 2a and 2b, and the vehicles 3 can communicate with each other via a network NW. The network NW is constituted, for example, by an Internet line network or a mobile phone line network.

Parking Lot Server

Figure 1:
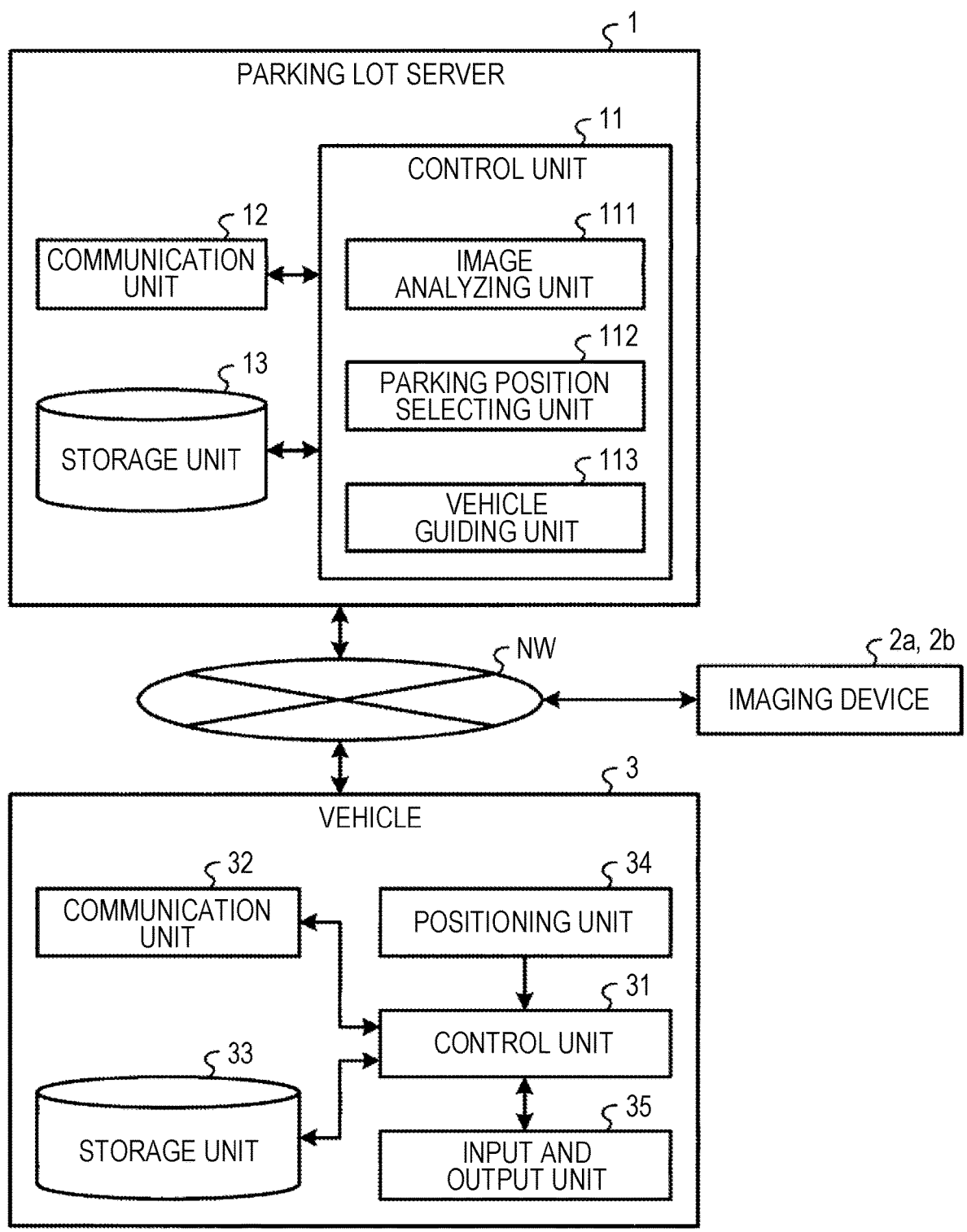
FIG. 1 is a block diagram schematically illustrating a parking lot management system to which a parking lot management device according to an embodiment of the disclosure can be applied.
Figure 2:
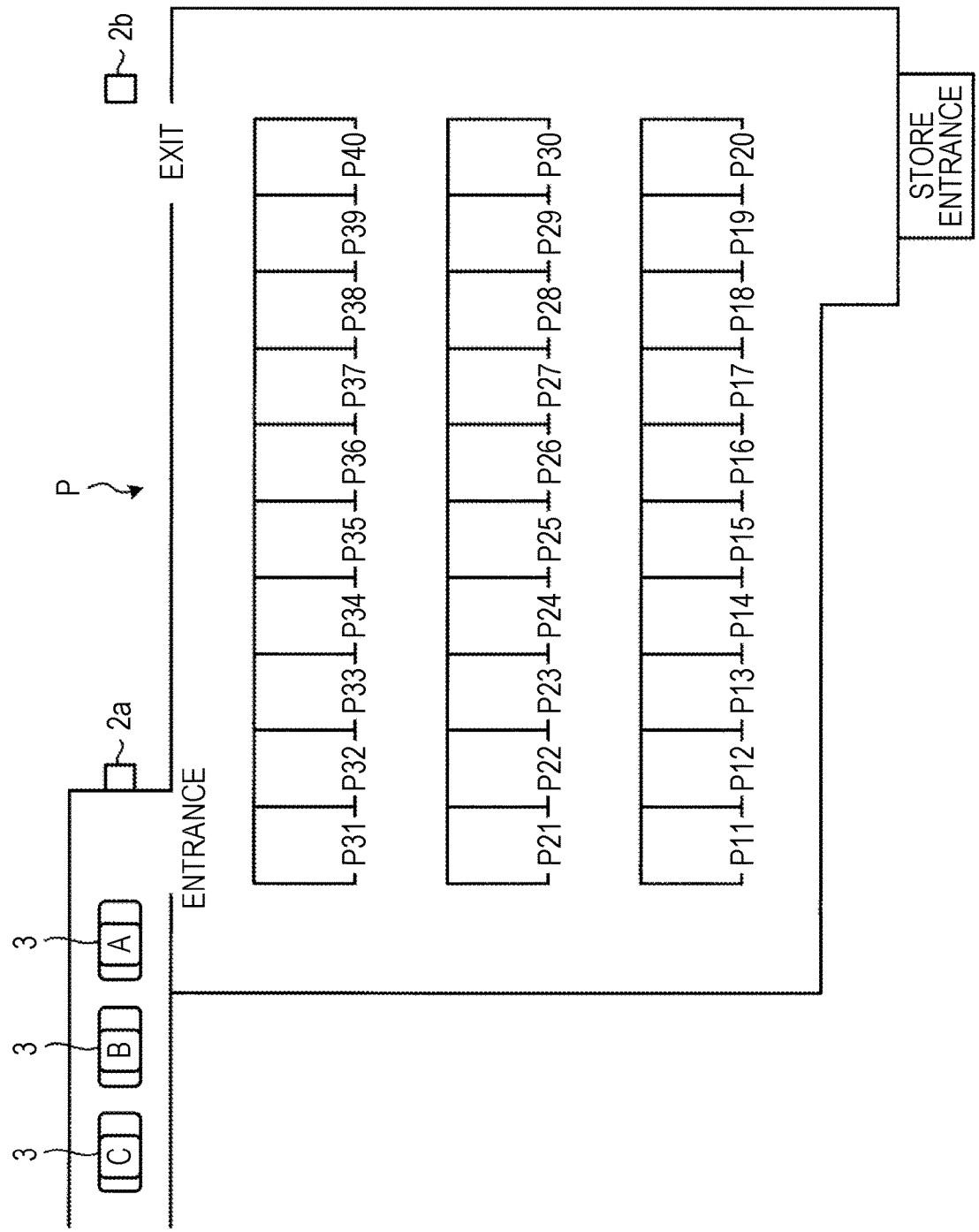
FIG. 2 is a diagram schematically illustrating an example of a layout of a parking lot which is managed by the parking lot management device according to the embodiment of the disclosure.

As illustrated in FIG. 2, the parking lot server 1 manages the vehicles 3 in a parking lot P by guiding a vehicle 3 entering the parking lot P to an empty parking position (a parking space) in the parking lot P. As illustrated in FIG. 1, the parking lot server 1 includes a control unit 11, a communication unit 12, and a storage unit 13.

The control unit 11 specifically includes a processor including a central processing unit (CPU), a digital signal processor (DSP), or a field-programmable gate array (FPGA), and a memory (a main storage unit) including a random access memory (RAM) or a read only memory (ROM) (none of which are illustrated).

The control unit 11 realizes functions matching a predetermined purpose by loading a program stored in the storage unit 13 to a work area of the main storage unit, executing the loaded program, and controlling constituent units or the like through execution of the program. The control unit 11 serves as an image analyzing unit 111, a parking position selecting unit 112, and a vehicle guiding unit 113 by executing the program. Details of the functional units will be described later.

Here, information on current positions of the vehicles 3 (hereinafter referred to as "vehicle position information") is periodically input to the parking lot server 1 from the vehicles 3 via the network NW. Accordingly, the control unit 11 of the parking lot server 1 can normally ascertain the positions of the vehicles 3 in the parking lot P. For example, information on states of the vehicles 3 including whether an engine of each vehicle 3 is started in addition to the vehicle position information may be periodically input to the parking lot server 1 from the vehicles 3 via the network NW.

An image of a vehicle 3 entering the parking lot P is input to the parking lot server 1 from the imaging device 2a via the network NW. An image of a vehicle 3 exiting the parking lot P is input to the parking lot server 1 from the imaging device 2b via the network NW. Accordingly, the control unit 11 of the parking lot server 1 can normally ascertain entrance and exit of a vehicle 3 into and from the parking lot P and empty parking positions in the parking lot P.

The communication unit 12 includes, for example, a local area network (LAN) interface board and a radio communication circuit for radio communication. The communication unit 12 is connected to the network NW such as the Internet which is a public communication network. The communication unit 12 communicates with the imaging devices 2*a* and 2*b* and the vehicles 3 by accessing the network NW.

The storage unit 13 includes an erasable programmable ROM (EPROM), a hard disk drive (HDD), and a recording medium such as a removable medium. Examples of the removable medium include disc recording mediums such as a Universal Serial Bus (USB) memory, a compact disc (CD), a digital versatile disc (DVD), and a Blu-ray (registered trademark) disc (BD). An operating system (OS), various programs, various tables, various types of data, and the like can be stored in the storage unit 13.

For example, vehicle position information which is input from the vehicles 3, information on states of the vehicles 3, images of the vehicles 3 which are input from the imaging devices 2*a* and 2*b*, information on the vehicles 3 (vehicle information) which is analyzed by the image analyzing unit 111 of the control unit 11, and the like are stored in the storage unit 13.

Imaging Devices

The imaging devices 2*a* and 2*b* are, for example, imaging cameras into which an imaging device such as a charge-coupled device (CCD) or a CMOS image sensor (CIS) is incorporated. As illustrated in FIG. 2, the imaging device 2*a* is installed in the vicinity of an entrance of the parking lot P and images the vehicles 3 which enter the parking lot P. The imaging device 2*a* transmits the captured images to the parking lot server 1 via the network NW.

As illustrated in FIG. 2, the imaging device 2*b* is installed in the vicinity of an exit of the parking lot P and images the vehicles 3 which exit the parking lot P. The imaging device 2*b* transmits the captured images to the parking lot server 1 via the network NW. The images which are captured by the imaging devices 2*a* and 2*b* may be one of still image data and moving image data or may be moving image data which is generated by combining a plurality of pieces of still image data which is continuous over time.

Vehicles

Each vehicle 3 is a mobile object that can communicate with the outside and includes a control unit 31, a communication unit 32, a storage unit 33, a positioning unit 34, and an input and output unit 35 as illustrated in FIG. 1. The control unit 31 and the storage unit 33 are physically the same as the control unit 11 and the storage unit 13.

The control unit 31 comprehensively controls operations of various elements which are mounted in the vehicle 3. The communication unit 32 is constituted by, for example, a data communication module (DCM) and communicates with the parking lot server 1 by radio communication via the network NW.

The positioning unit 34 receives radio waves from Global Positioning System (GPS) satellites (not illustrated) and detects a current position of the vehicle 3. The positioning unit 34 outputs information on the detected current position of the vehicle 3 (hereinafter referred to as "vehicle position information") to the control unit 31. Accordingly, the control unit 31 outputs the vehicle position information to the parking lot server 1 via the network NW. The method of detecting vehicle position information is not limited to the method using the GPS satellites and, for example, a method using Light Detection and Ranging or Laser Imaging Detection and Ranging (LiDAR) and a three-dimensional digital map in combination may be used.

The input and output unit 35 is constituted by, for example, a touch panel display and a speaker microphone. The input and output unit 35 which serves as an output unit notifies the outside of predetermined information by displaying characters, figures, or the like on a screen of the touch panel display or outputting voice from the speaker microphone under the control of the control unit 31.

On the other hand, the input and output unit 35 inputs predetermined information to the control unit 31 by allowing a user such as a driver of the vehicle 3 to operate the touch panel display or to utter voice to the speaker microphone. The vehicle 3 according to this embodiment includes the positioning unit 34 and the input and output unit 35 as different functions, but may include an onboard navigation system with a communication function (hereinafter referred to as "onboard navigation") having the functions of the positioning unit 34 and the input and output unit 35 together instead of the positioning unit 34 and the input and output unit 35.

Parking Lot Management Method

A parking lot management method which is performed by the parking lot management device according to this embodiment will be described below with reference to FIGS. 2 and 3. In the following description, parking lot management in a case in which a plurality of vehicles 3 enter the parking lot P at the same time as illustrated in FIG. 2 will be described. The parking lot P illustrated in the drawing includes an entrance through which the vehicles 3 enter, an exit which the vehicles 3 exit, and a store entrance which is connected to, for example, a store (not illustrated) adjacent to the parking lot P. An elevator which is connected to the store may be provided instead of the store entrance. Parking positions of three lines each including 10 positions, that is, a total of 30 parking positions P11 to P40, are provided in the parking lot P.

Figure 3:
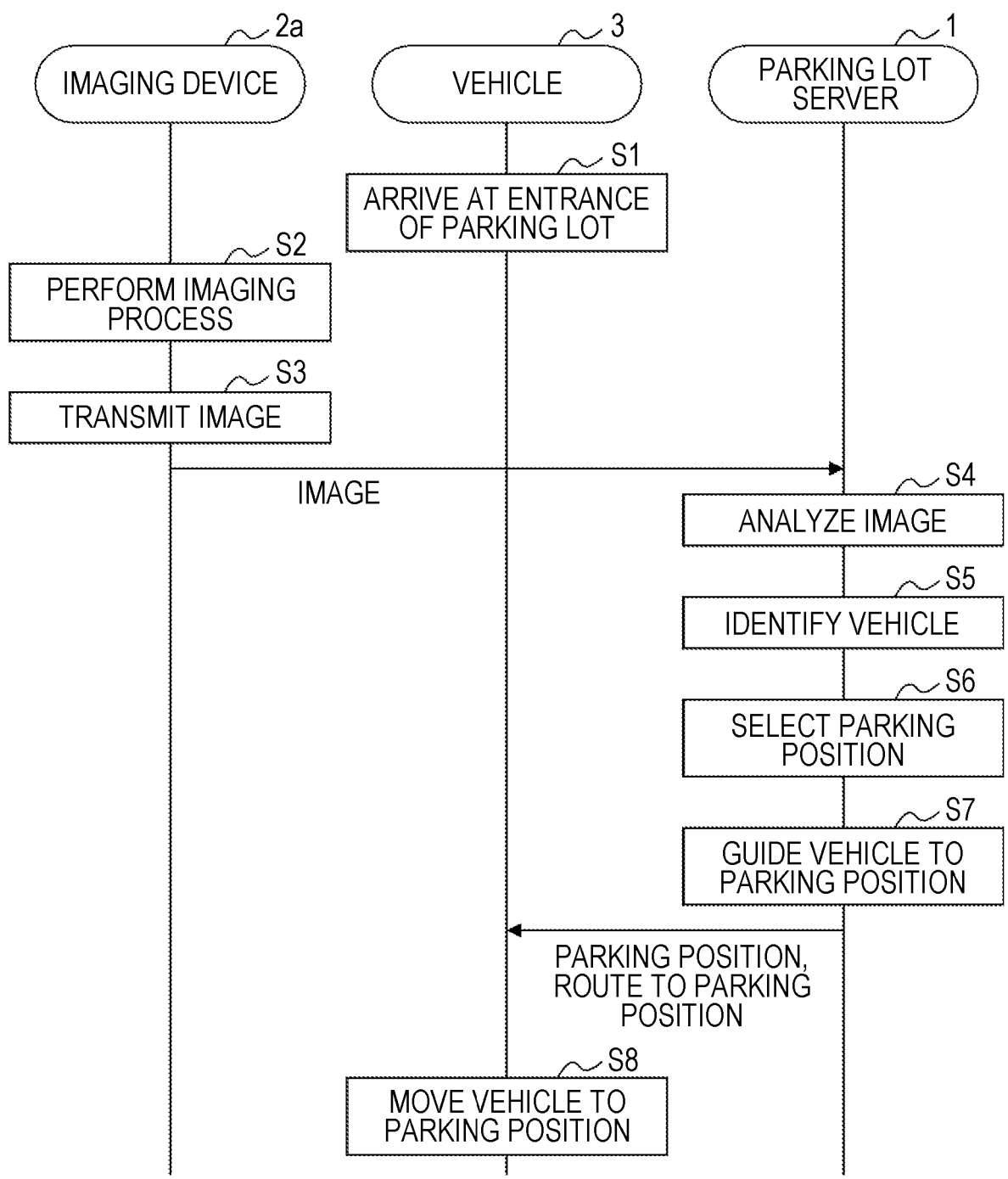
FIG. 3 is a flowchart illustrating a process sequence of a parking lot management method according to the embodiment of the disclosure.

As illustrated in FIG. 3, first, when the plurality of vehicles 3 arrives at the entrance of the parking lot P (Step S1), the imaging device 2*a* images the plurality of vehicles 3 (Step S2) and transmits images to the parking lot server 1 (Step S3).

Subsequently, the image analyzing unit 111 of the parking lot server 1 identifies the plurality of vehicles 3 (Step S5) which enter the parking lot P by analyzing the images input from the imaging device 2*a* (Step S4). The image analyzing unit 111 specifically identifies information for identifying the vehicles 3 (hereinafter referred to as "vehicle information") such as vehicle numbers of the vehicles 3, classification of ordinary vehicle/light vehicle, or vehicle models using a known image recognition technique for the images captured at the entrance of the parking lot P. The image analyzing unit 111 temporarily stores the identified vehicle information in the storage unit 13.

Subsequently, the parking position selecting unit 112 of the parking lot server 1 selects parking positions at which the vehicles 3 are to park in the parking lot P (Step S6). The parking position selecting unit 112 specifically selects parking positions which are different in the parking lot P and in which moving routes from the entrance of the parking lot P to the parking positions do not interfere with movement and parking of other vehicles 3 in the parking lot P for a plurality of vehicles 3. That is, the parking position selecting unit 112 selects parking positions for the plurality of vehicles 3 in which moving routes from the entrance of the parking lot P to the parking positions do not overlap moving routes of other vehicles 3 in the parking lot P and do not interfere with parking spaces of other vehicles 3 in the parking lot P. A specific example in which a vehicle 3 is guided to a parking position by the parking position selecting unit 112 will be described later (see FIGS. 4 to 12).

Subsequently, the vehicle guiding unit 113 of the parking lot server 1 transmits the selected parking positions and the moving routes from the entrance of the parking lot P to the parking positions to the vehicles 3 and notifies drivers of the vehicles 3 of the parking positions and the moving routes. Accordingly, the vehicle guiding unit 113 guides the vehicles 3 to the parking positions (Step S7). Then, the vehicles 3 move along the designated moving routes to the designated parking positions (Step S8).

Here, the method of notifying the drivers of the vehicles 3 of the parking positions and the moving routes in Step S7 is not particularly limited. For example, any one of notification using the touch panel display or the speaker microphone of the input and output unit 35 of the vehicle 3, notification using a screen of the onboard navigation system which is not illustrated, notification using mobile phones which are carried by the drivers of the vehicles 3 or head mounted displays (HMD) which are worn by the drivers, and notification using guide panels (not illustrated) which are installed in the parking lot P or guide lights (not illustrated) which are installed on the surface of the parking lot P may be used.

The control unit 11 of the parking lot server 1 normally monitors the positions of the vehicles 3 in the parking lot P based on the vehicle position information which is input from the vehicles 3 as described above. Accordingly, for example, in Step S8, when a vehicle 3 which is going to park at a parking position other than the transmitted parking position has been found, the control unit 11 may transmit warning information to the vehicle 3 and notify the driver of the vehicle 3 of a warning. That is, the control unit 11 may prompt a vehicle 3 which is going to park at an erroneous parking position to park at a correct parking position by issuing a warning.

The method of notifying the driver of a warning is not particularly limited and, for example, any one of notification using the touch panel display or the speaker microphone of the input and output unit 35 of the vehicle 3, notification using the screen of the onboard navigation system which is not illustrated, notification using mobile phones which are carried by the drivers of the vehicles 3 or head mounted displays (HMD) which are worn by the drivers, and notification using warning devices such as warning panels or warning speakers which are installed in the vicinity of the parking positions may be used.

Example of Guidance to Parking Position

An example of the method of guiding a plurality of vehicles 3 which enters the parking lot P to the parking positions in the parking lot management method according to the embodiment will be described below with reference to FIGS. 4 to 12. A method of guiding each vehicle to the corresponding position when three vehicles 3 (a vehicle A, a vehicle B, and a vehicle C) sequentially enter the parking P at the same time will be described below. In the following description, when the three vehicles 3 are collectively called, they are referred to as "vehicles 3." When the individual vehicles 3 are called, they are referred to as "a vehicle A, a vehicle B, and a vehicle C."

Guidance Example 1

Figure 4:
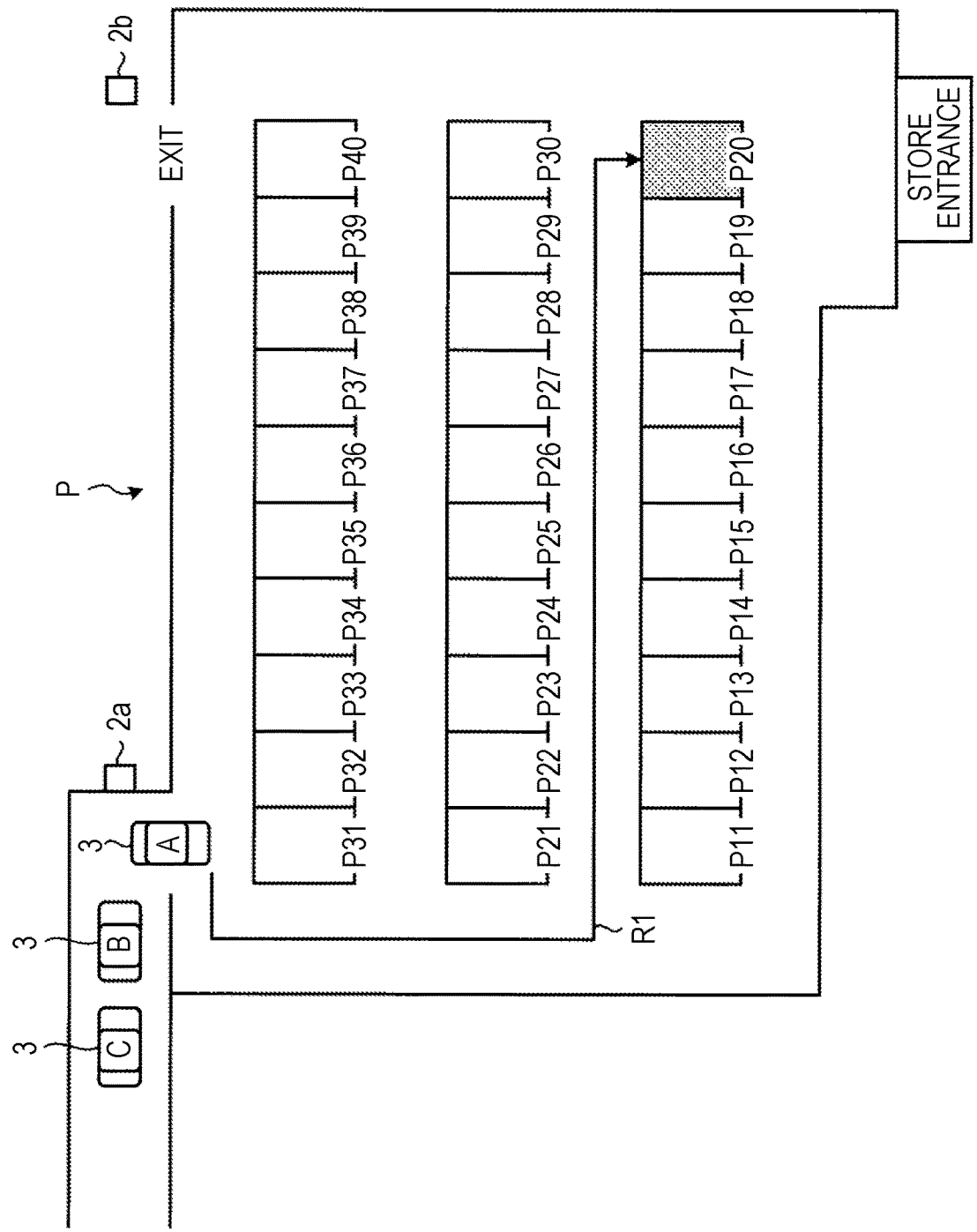
FIG. 4 is a diagram illustrating an example (Guidance Example 1) of a method of guiding a vehicle entering a parking lot to a parking position in the parking lot management method according to the embodiment of the disclosure.

First, as illustrated in FIG. 4, a case in which there is no other vehicle 3 which is moving in the parking lot P or is parking in the parking lot P when the first vehicle A enters the parking lot P will be described. In this case, the parking position selecting unit 112 selects a parking position P20 which is as close to the store entrance as possible as the parking position of the vehicle A. Then, the vehicle guiding unit 113 notifies the vehicle A of the parking position P20 and a moving route R1 to the parking position P20 and guides the vehicle A to the parking position P20.

Guidance Example 2

Figure 5:
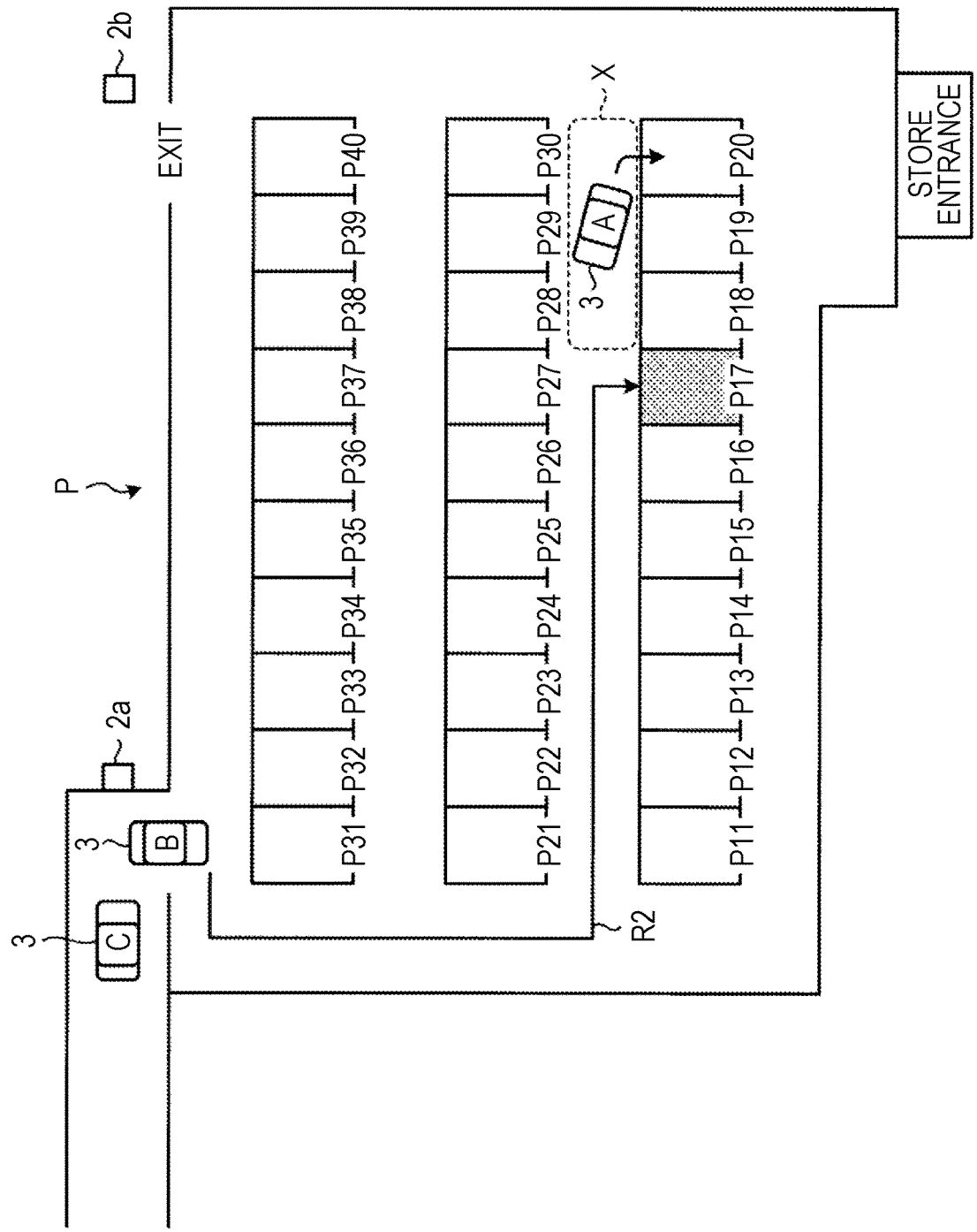
FIG. 5 is a diagram illustrating an example (Guidance Example 2) of a method of guiding a vehicle entering a parking lot to a parking position in the parking lot management method according to the embodiment of the disclosure.

As illustrated in FIG. 5, a case in which there is a vehicle A which is parking at the parking position P20 when the second vehicle B enters the parking lot P will be described. In this case, the parking position selecting unit 112 selects a parking position which is different from the parking position P20 and which does not interfere with parking of the vehicle A as the parking position of the vehicle B.

That is, the parking position selecting unit 112 selects a parking position P17 which is different from the parking position P20, which is as close to the store entrance as possible, and in which the moving route from the entrance of the parking lot P to the parking position does not interference with a parking space (see range X surrounded with a dotted line in FIG. 5) required for parking of the vehicle A as the parking position of the vehicle B. Then, the vehicle guiding unit 113 notifies the vehicle B of the parking position P17 and a moving route R2 to the parking position P17 and guides the vehicle B to the parking position P17.

Guidance Example 3

Figure 6:
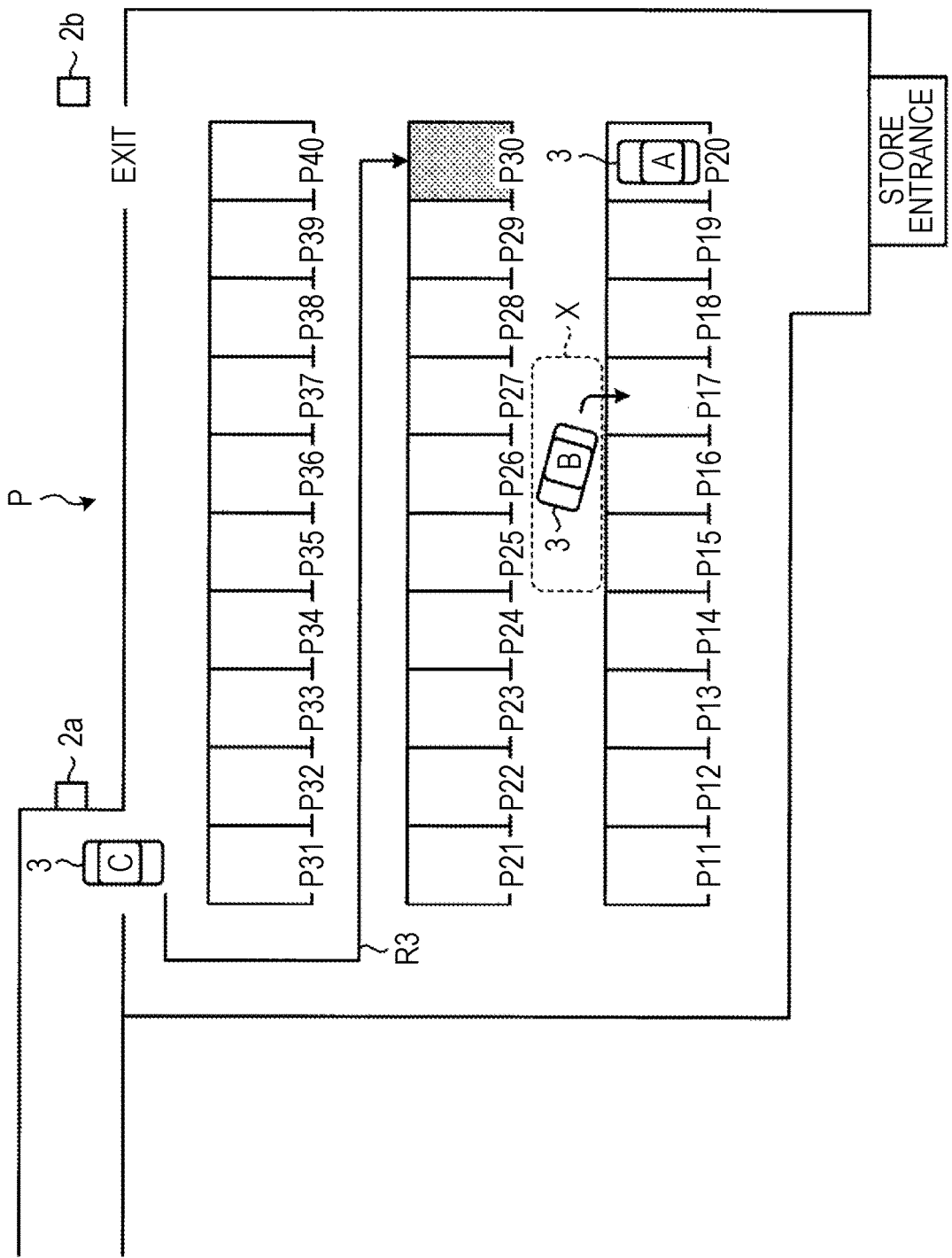
FIG. 6 is a diagram illustrating an example (Guidance Example 3) of a method of guiding a vehicle entering a parking lot to a parking position in the parking lot management method according to the embodiment of the disclosure.

As illustrated in FIG. 6, a case in which there is a vehicle A which parks at the parking position P20 and there is a vehicle B which is parking at the parking position P17 when the third vehicle C enters the parking lot P will be described. In this case, the parking position selecting unit 112 selects a parking position which is different from the parking positions P20 and P17 and which does not interfere with parking of the vehicle B as the parking position of the vehicle C.

That is, the parking position selecting unit 112 selects a parking position P30 which is different from the parking positions P20 and P17, which is as close to the store entrance as possible, and in which the moving route from the entrance of the parking lot P to the parking position does not interference with a parking space (see a range X surrounded with a dotted line in FIG. 6) required for parking of the vehicle B as the parking position of the vehicle C. Then, the vehicle guiding unit 113 notifies the vehicle C of the parking position P30 and a moving route R3 to the parking position P30 and guides the vehicle C to the parking position P30.

Guidance Example 4

Figure 7:
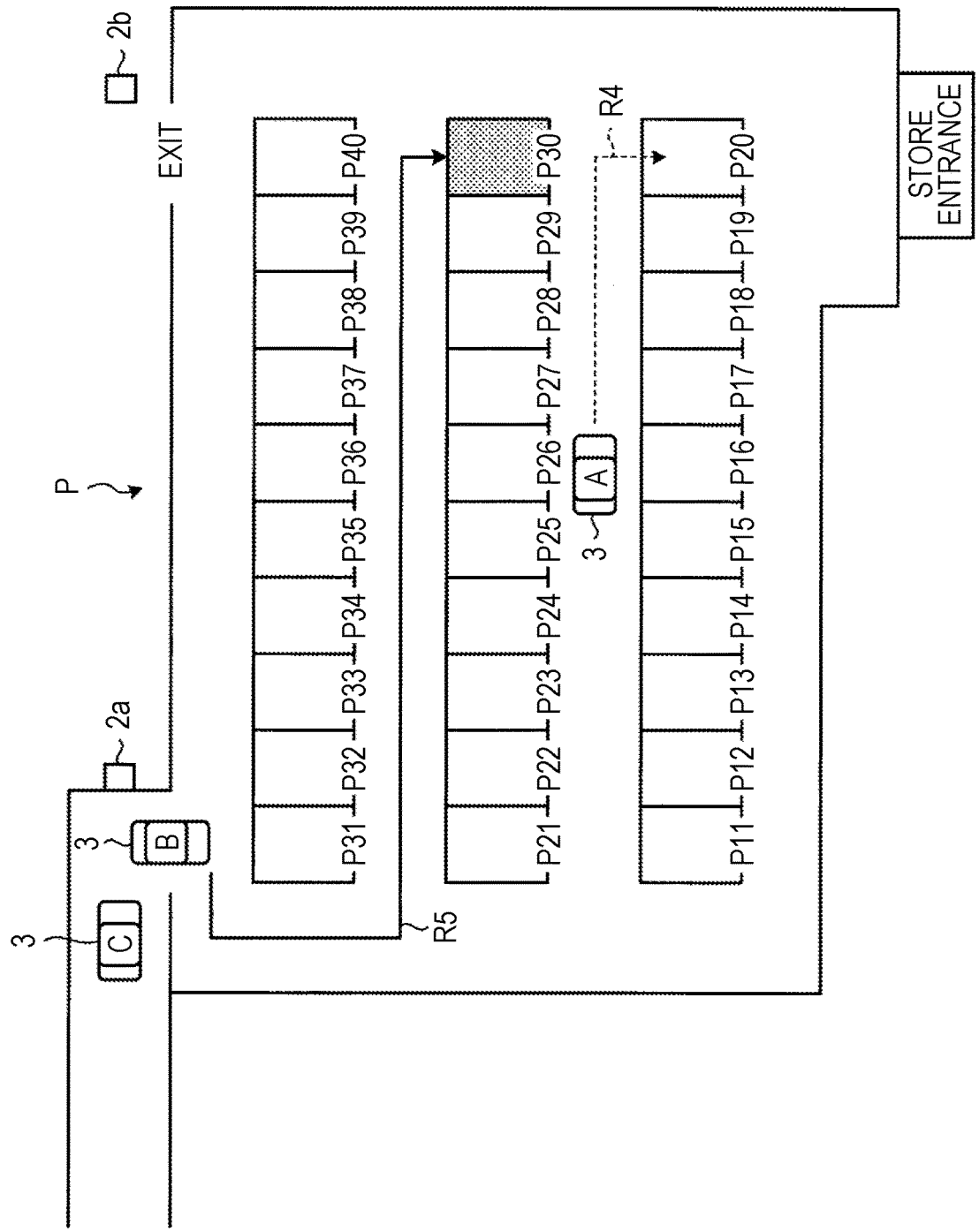
FIG. 7 is a diagram illustrating an example (Guidance Example 4) of a method of guiding a vehicle entering a parking lot to a parking position in the parking lot management method according to the embodiment of the disclosure.

As illustrated in FIG. 7, a case in which there is a vehicle A which is moving for parking at the parking position P20 when the second vehicle B enters the parking lot P will be described. In this case, the parking position selecting unit 112 selects a parking position which is different from the parking position P20 and which does not interfere with movement of the vehicle A as the parking position of the vehicle B.

That is, the parking position selecting unit 112 selects a parking position P30 which is different from the parking position P20, which is as close to the store entrance as possible, and in which the moving route from the entrance of the parking lot P to the parking position does not overlap a moving route R4 of the vehicle A as the parking position of the vehicle B. Then, the vehicle guiding unit 113 notifies the vehicle B of the parking position P30 and a moving route R5 to the parking position P30 and guides the vehicle B to the parking position P30. The moving route R4 of the vehicle A which is indicated by a dotted line is a moving route along which the vehicle A previously entering the parking lot P moves from the entrance of the parking lot P to the parking position P20, and the vehicle A enters the parking lot P before the vehicle B.

Guidance Example 5

Figure 8:
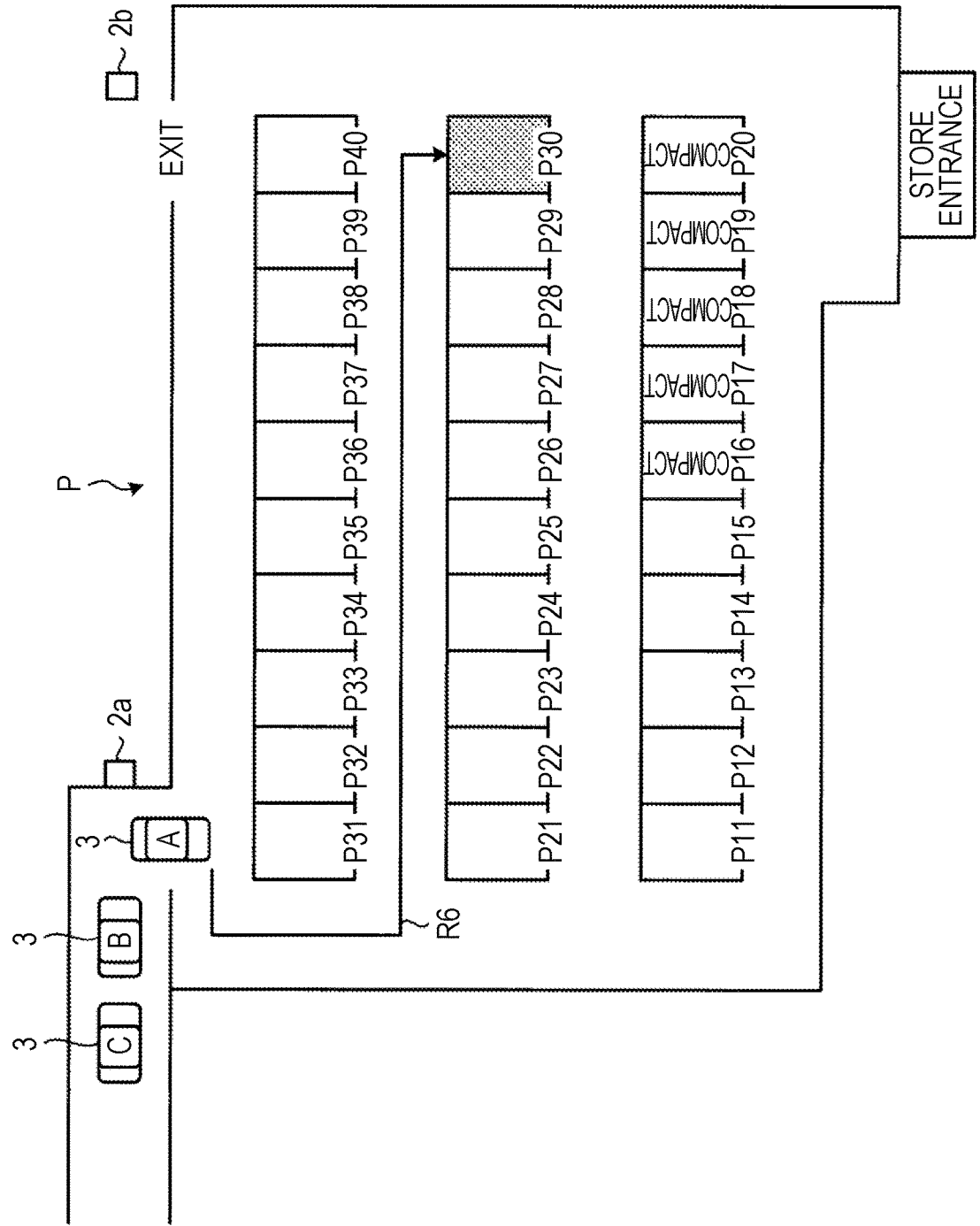
FIG. 8 is a diagram illustrating an example (Guidance Example 5) of a method of guiding a vehicle entering a parking lot to a parking position in the parking lot management method according to the embodiment of the disclosure.

As illustrated in FIG. 8, a case in which parking spaces for light vehicles (parking positions P16 to P20) are provided in the parking lot P and a first vehicle A which is an ordinary vehicle enters the parking lot P will be described. In this case, the parking position selecting unit 112 selects a parking position P30 which is different from the parking positions P16 to P20 for light vehicles and which is as close to the store entrance as possible as the parking position of the vehicle A. Then, the vehicle guiding unit 113 notifies the vehicle A of the parking position P30 and a moving route R6 to the parking position P30 and guides the vehicle A to the parking position P30.

In this way, when there are parking positions (parking spaces) at which a specific vehicle 3 cannot park in the parking lot P, the parking position selecting unit 112 selects a parking position except for the parking positions. Examples of the parking positions at which a vehicle cannot park include parking spaces for the disabled in addition to the parking spaces for light vehicles illustrated in FIG. 8.

Guidance Example 6

Figure 9:
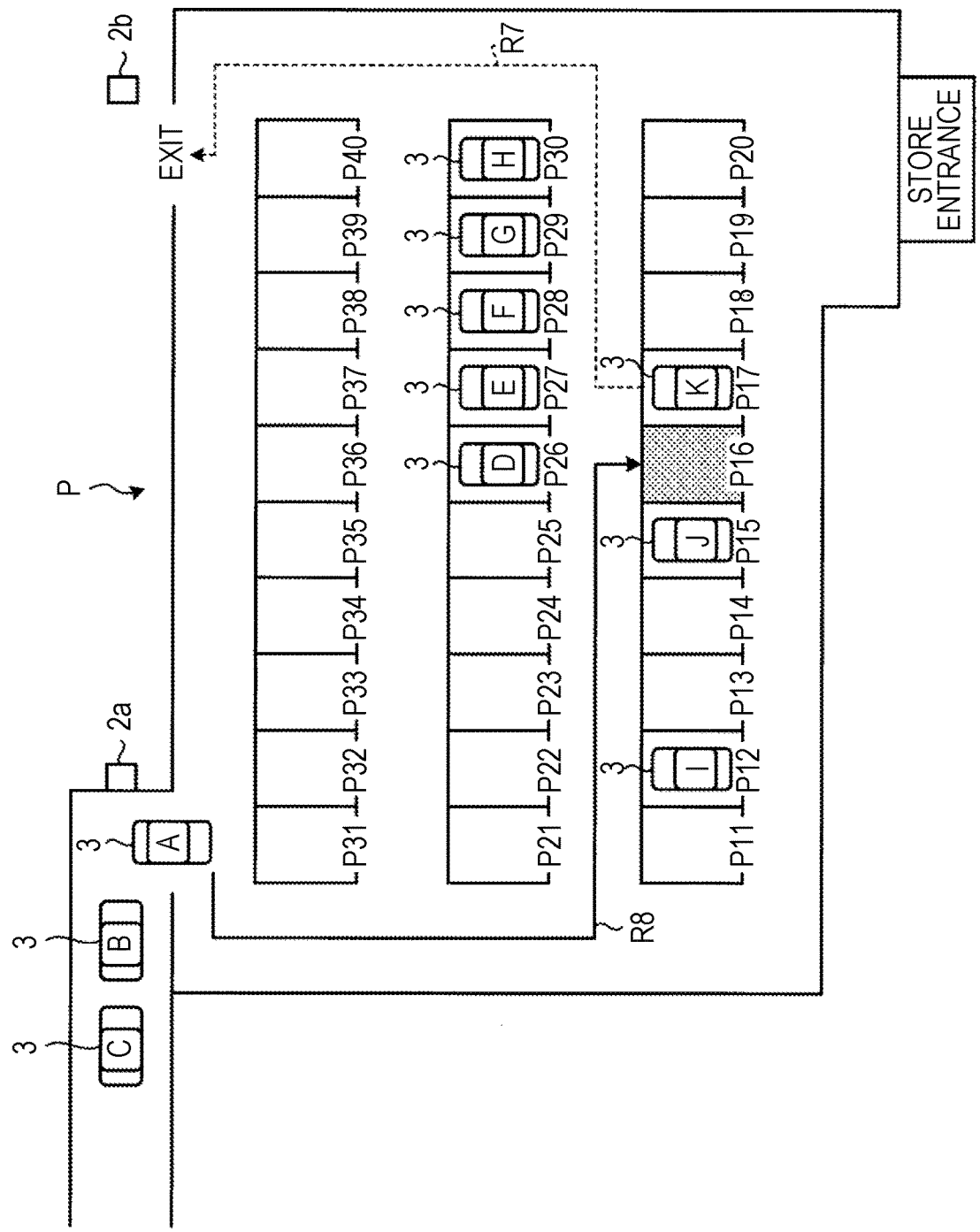
FIG. 9 is a diagram illustrating an example (Guidance Example 6) of a method of guiding a vehicle entering a parking lot to a parking position in the parking lot management method according to the embodiment of the disclosure.

As illustrated in FIG. 9, a case in which there are vehicles D to J which park at the parking positions P26 to P30, P12, and P15 and a vehicle K which parks at the parking position P17 is going to exit the parking lot P when the first vehicle A enters the parking lot P will be described. In this case, the parking position selecting unit 112 selects a parking position which is different from the parking positions P26 to P30, P12, P15, and P17 and which does not interfere with movement of the vehicle K as the parking position of the vehicle A.

That is, the parking position selecting unit 112 selects a parking position P16 which is different from the parking positions P26 to P30, P12, P15, and P17, which is as close to the store entrance as possible, and in which the moving route from the entrance of the parking lot P to the parking position does not overlap a moving route R7 of the vehicle K as the parking position of the vehicle A. Then, the vehicle guiding unit 113 notifies the vehicle A of the parking position P16 and a moving route R8 to the parking position P16 and guides the vehicle A to the parking position P16. The moving route R7 of the vehicle K which is indicated by a dotted line is a moving route along which the vehicle K which is going to exit the parking lot P moves from the parking position P17 to the exit of the parking lot P.

The parking position selecting unit 112 predicts times at which the vehicles D to K exit the parking lot P (hereinafter referred to as "scheduled exit times") using a statistical technique based on times having elapsed from the vehicles D to K parked in the parking lot P have been parked. When the vehicle A enters the parking lot P, the parking position selecting unit 112 determines whether there is a vehicle 3 which is going to exit the parking lot P based on the scheduled exit times of the vehicles 3. For example, when there is a vehicle 3 which is predicted to exit the parking lot P such as the vehicle K, the parking position selecting unit 112 selects the parking position P16 which does not interfere with the moving route R7 of the vehicle K as the parking position of the vehicle A.

The method of determining whether there is a vehicle 3 which is going to exit the parking lot P is not limited to the statistical technique. The parking position selecting unit 112 may detect whether there is a vehicle 3 of which an engine is started when the vehicle A enters the parking lot P, for example, based on information on vehicle states input from the vehicles 3 in the parking lot P, and select a parking position which does not interfere with the moving route of the vehicle 3 as the parking position of the vehicle A when there is a vehicle 3 of which an engine is started.

Figure 10:
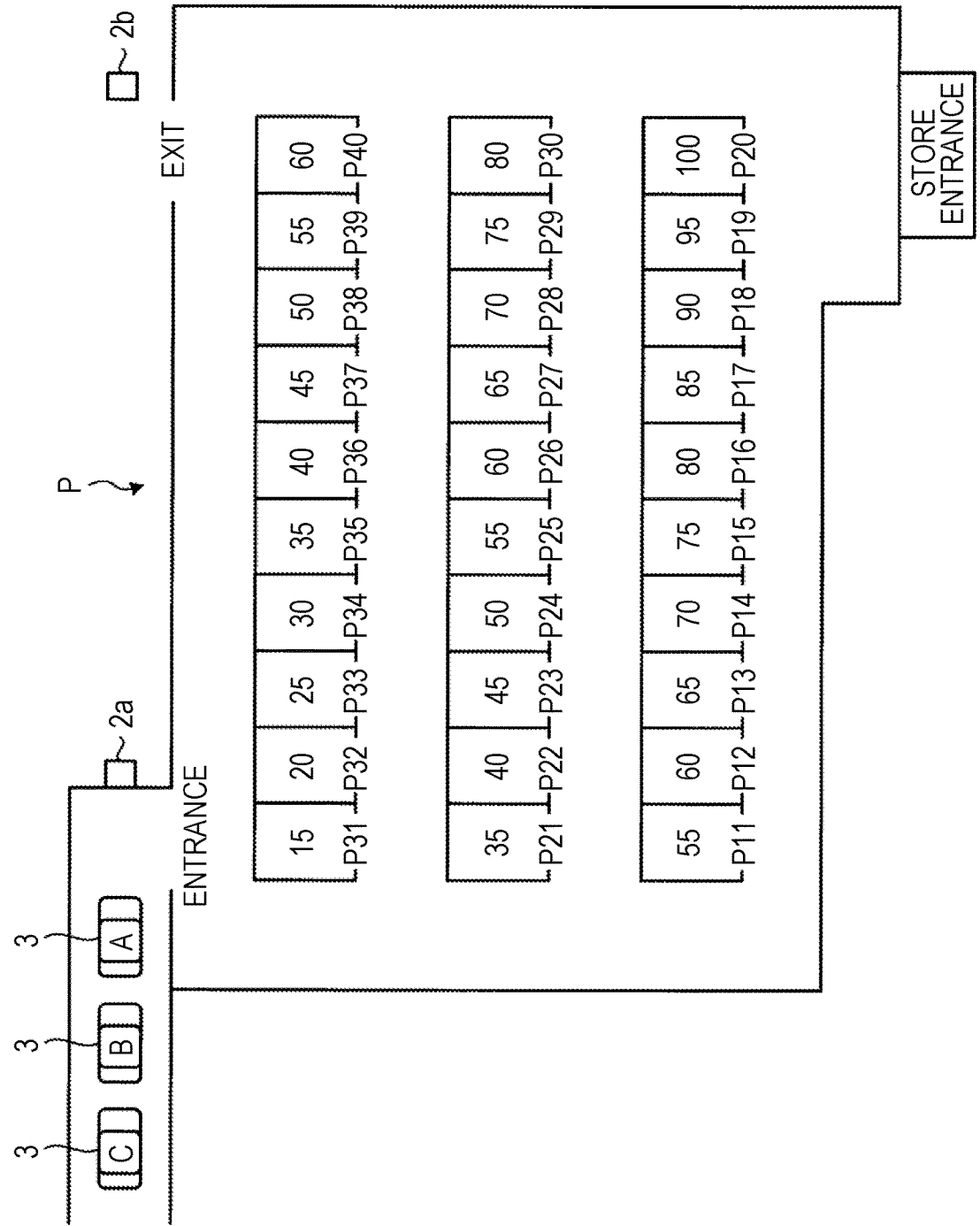
FIG. 10 is a diagram illustrating an example in which scores are set for parking positions of a parking lot in the parking lot management method according to the embodiment of the disclosure.

For example, as illustrated in FIG. 10, the parking position selecting unit 112 may set scores for the parking positions in the parking lot P based on a preset criterion and sequentially select parking positions with higher scores in the order of the vehicles 3 entering the parking lot P.

For example, as illustrated in FIG. 10, the scores of the parking positions are set to be higher as they become closer to the store entrance and are set to be lower as they become farther from the store entrance (as they become closer to the entrance of the parking lot P). The parking position selecting unit 112 increases or decreases the scores of the parking positions depending on a situation in the parking lot P, that is, whether there is a vehicle 3 which is moving or parking in the parking lot P, when a vehicle 3 enters the parking lot P. Then, the parking position selecting unit 112 selects the parking position of the vehicle 3 entering the parking lot P based on the increased or decreased scores. An example in which a parking position of a vehicle 3 is selected based on the scores set for the parking positions in the parking lot P will be described below.

Guidance Example 7

Figure 11:
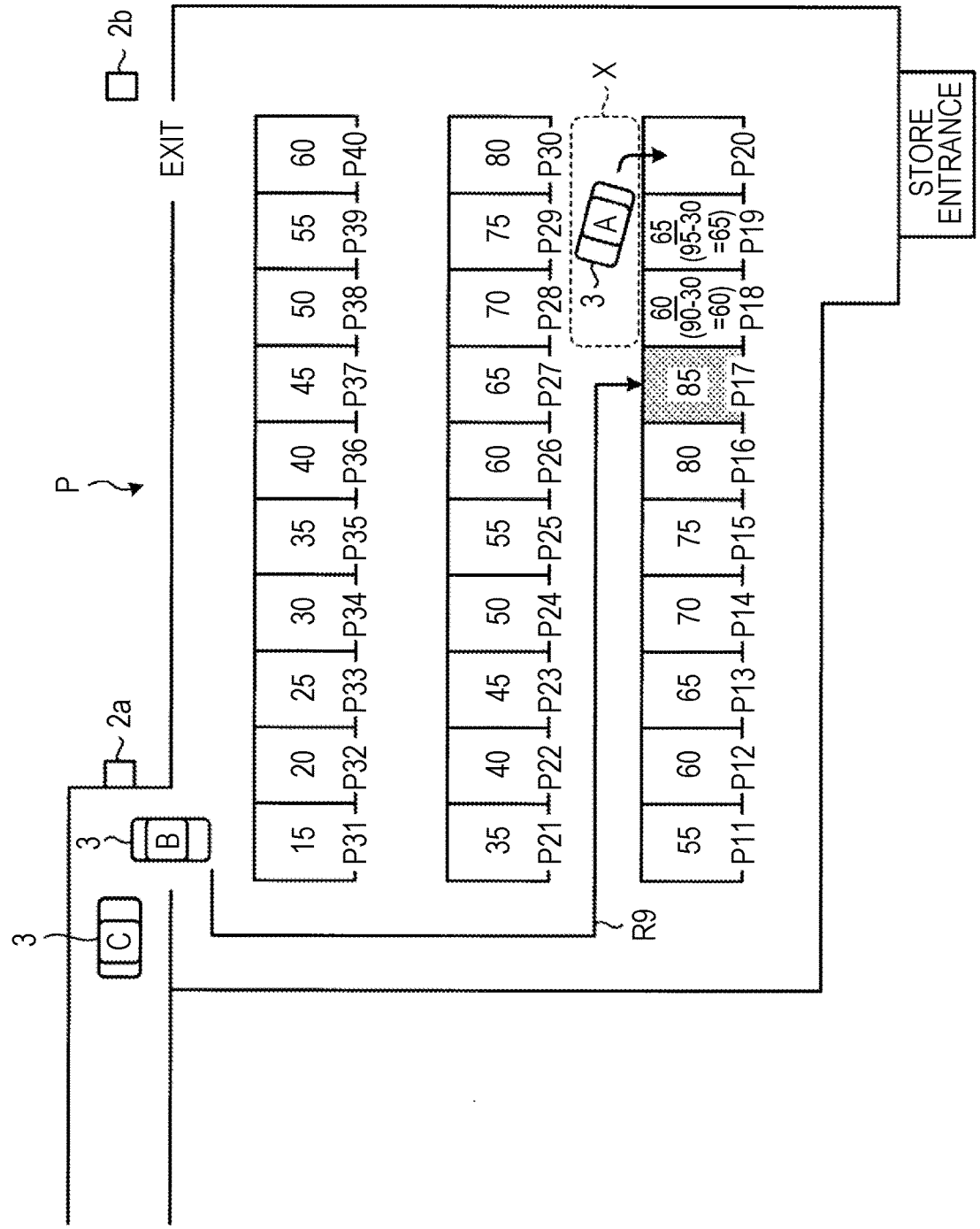
FIG. 11 is a diagram illustrating an example (Guidance Example 7) of a method of guiding a vehicle entering a parking lot to a parking position in the parking lot management method according to the embodiment of the disclosure.

First, as illustrated in FIG. 11, a case in which there is a vehicle A parked at the parking position P20 when the second vehicle B enters the parking lot P will be described. In this case, the parking position selecting unit 112 decreases the scores of the parking positions P18 and P19 adjacent to the parking space (see a range X surrounded by a dotted line in FIG. 11) required for parking of the vehicle A from the original scores. The parking position selecting unit 112 decreases the scores of the parking positions P18 and P19, for example, by 30.

Then, the parking position selecting unit 112 selects a parking position P17 which is different from the parking position P20, which is as close to the store entrance as possible, and which has the highest score as the parking position of the vehicle B. Then, the vehicle guiding unit 113 notifies the vehicle B of the parking position P17 and a moving route R9 to the parking position P17 and guides the vehicle B to the parking position P17.

Guidance Example 8

Figure 12:
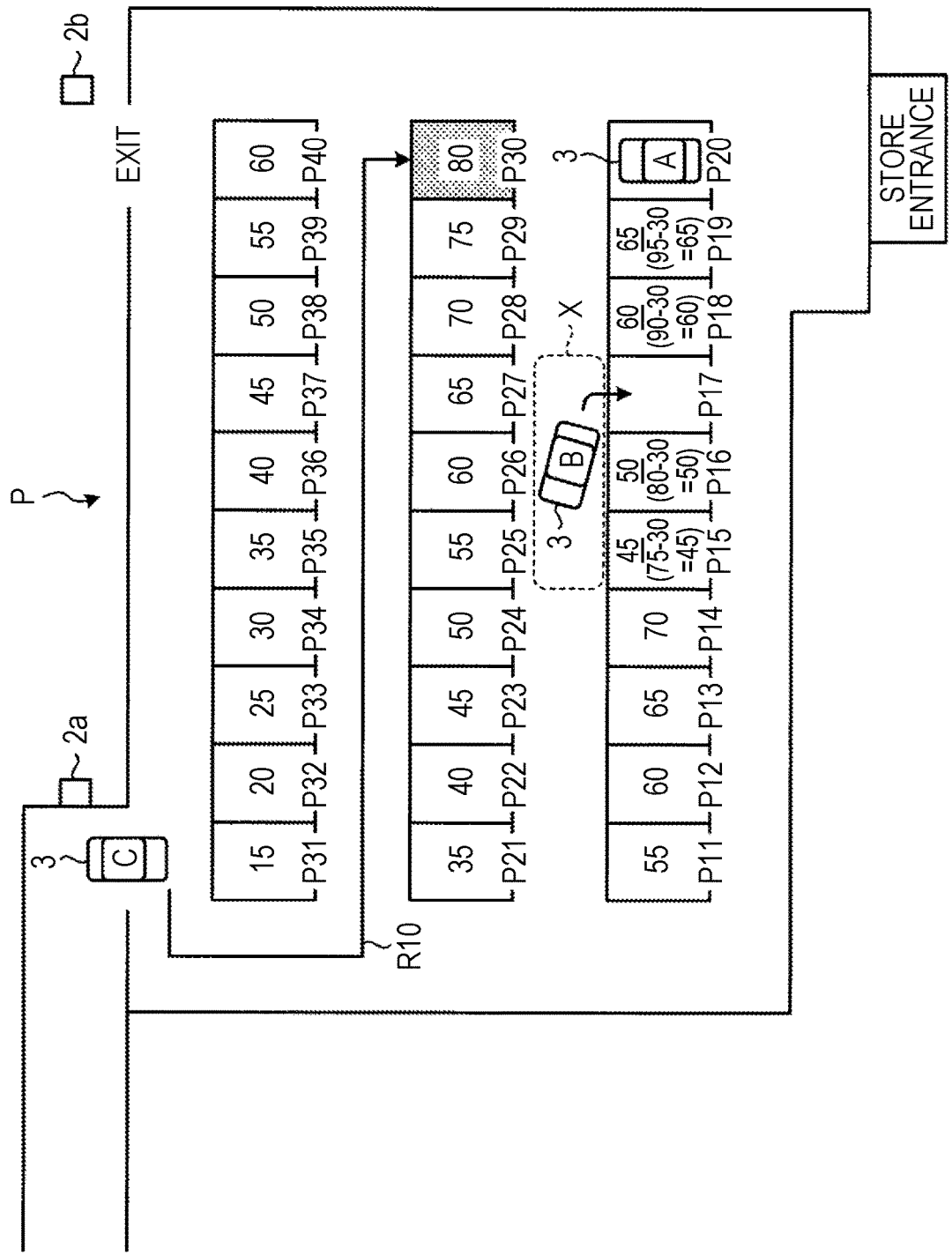
FIG. 12 is a diagram illustrating an example (Guidance Example 8) of a method of guiding a vehicle entering a parking lot to a parking position in the parking lot management method according to the embodiment of the disclosure.

As illustrated in FIG. 12, a case in which there is a vehicle A parked at the parking position P20 and there is a vehicle B which is parking at the parking position P17 when the third vehicle C enters the parking lot P will be described below. In this case, the parking position selecting unit 112 decreases the scores of the parking positions P15, P16, P18, and P19 adjacent to the parking space (see a range X surrounded by a dotted line in FIG. 12) required for parking of the vehicle B from the original scores. The parking position selecting unit 112 decreases the scores of the parking positions P15, P16, P18, and P19, for example, by 30.

Then, the parking position selecting unit 112 selects a parking position P30 which is different from the parking positions P15 to P20, which is as close to the store entrance as possible, and which has the highest score as the parking position of the vehicle C. Then, the vehicle guiding unit 113 notifies the vehicle C of the parking position P30 and a moving route R10 to the parking position P30 and guides the vehicle C to the parking position P30.

With the parking lot management device, the parking lot management method, and the parking lot management program according to the embodiment, since a plurality of vehicles 3 which enters the parking lot P is guided for parking positions which do not interfere with movement and parking of other vehicles 3 and moving routes to the parking positions, it is possible to resolve congestion in the parking lot P.

With the parking lot management device, the parking lot management method, and the parking lot management program according to the embodiment, since parking positions to which moving routes do not interfere with each other are allocated to the vehicles 3 entering the parking lot P, the vehicles can smoothly move to the parking positions and can rapidly park without any waiting time.

New advantageous effects or modified examples can be easily derived by those skilled in the art. Accordingly, a broader aspect of the disclosure is not limited to the specific details described and illustrated above and the representative embodiment. Accordingly, the disclosure can be modified in various forms without departing from the idea or scope of the comprehensive concept of the disclosure which is defined by the appended claims and equivalents thereof.

For example, in the above-mentioned embodiment, guidance is started at a time point at which a vehicle 3 has arrived at the parking lot P, but the vehicle 3 may be notified of a position and a route of the parking lot P with an empty parking position using the input and output unit 35 of the vehicle 3, an onboard navigation system which is not illustrated, or a mobile terminal which is carried by a driver of the vehicle 3 or a head mounted display which is worn by the driver in advance and may be guided to the parking lot P before the vehicle 3 arrives at the parking lot P.

In the above-mentioned embodiment, the parking lot P includes one floor as illustrated in FIG. 2, but the parking lot P may include a plurality of floors. When the parking lot P includes a plurality of floors, the logic of the disclosure may be applied to the parking positions of all the floors of the parking lot P, and a floor and a parking position to which a vehicle 3 is guided may be determined. Alternatively, the logic of the disclosure may be applied to each floor of the parking lot P, a floor on which the vehicle 3 is to park may be selected by a driver of the vehicle 3, and a parking position of the floor to which the vehicle 3 is to be guided may be determined when the vehicle 3 enters an entrance of the floor.

In the above-mentioned embodiment, the control unit 11 normally monitors positions of vehicles 3 in a parking lot P based on vehicle position information which is input from the vehicles 3, but the positions of the vehicles 3 may be normally monitored using an imaging device, a sensor, or the like which is installed in the parking lot P instead of the vehicle position information.

What is claimed is:

1. A parking lot management device comprising:
   a memory; and
   a processor that includes hardware,
   wherein the processor is configured to:
   identify a plurality of vehicles which enters a parking lot by analyzing an image which is captured at an entrance of the parking lot, the plurality of vehicles including a first vehicle;
   select parking positions which are different in the parking lot and in which moving routes from the entrance of the parking lot to the parking positions do not interfere with movement and parking of other vehicles in the parking lot and do not overlap moving routes of other vehicles in the parking lot for the plurality of vehicles, the other vehicles including a second vehicle; and
   transmit the selected parking positions and the moving routes to the parking positions to the plurality of vehicles; wherein
   while the second vehicle is guided on a second moving route, the first vehicle is guided on a first moving route that does not overlap the second moving route from a position after the entrance of the parking lot up to and including a selected parking position for the first vehicle.

2. The parking lot management device according to claim 1, wherein the processor is configured to select parking positions which do not interfere with parking spaces of other vehicles in the parking lot for the plurality of vehicles.

3. The parking lot management device according to claim 2, wherein the moving routes of other vehicles in the parking lot include a moving route on which a vehicle entering the parking lot moves from the entrance of the parking lot to a parking position thereof and a moving route on which a vehicle exiting the parking lot moves from a parking position thereof to an exit of the parking lot.

4. The parking lot management device according to claim 1, wherein the processor is configured to monitor positions of the vehicles in the parking lot based on position information which is input from the plurality of vehicles and to transmit warning information to a vehicle which is going to park at a parking position which is different from the transmitted parking position.

5. The parking lot management device according to claim 1, wherein the processor is configured to:
   set scores for parking positions in the parking lot based on a preset criterion; and
   select the parking positions with higher scores for the plurality of vehicles in the order of entering the parking lot.

6. The parking lot management device according to claim 1, wherein scores are set for the parking positions, respectively, and when a vehicle is parked in a predetermined parking position, the processor is configured to decrease a score of a parking position adjacent to the predetermined parking position.

7. A parking lot management method which is performed by a parking lot management device, the parking lot management method causing a processor of the parking lot management device to perform:
   identifying a plurality of vehicles which enters a parking lot by analyzing an image which is captured at an entrance of the parking lot, the plurality of vehicles including a first vehicle;
   selecting parking positions which are different in the parking lot and in which moving routes from the entrance of the parking lot to the parking positions do not interfere with movement and parking of other vehicles in the parking lot and do not overlap moving routes of other vehicles in the parking lot for the plurality of vehicles, the other vehicles including a second vehicle; and transmitting the selected parking positions and the moving routes to the parking positions to the plurality of vehicles; wherein while the second vehicle is guided on a second moving route, the first vehicle is guided on a first moving route that does not overlap the second moving route from a position after the entrance of the parking lot up to and including a selected parking position for the first vehicle.

8. A non-transitory storage medium storing instructions that are executable by one or more processors and that cause the one or more processors to perform functions comprising:

identifying a plurality of vehicles which enters a parking lot by analyzing an image which is captured at an entrance of the parking lot, the plurality of vehicles including a first vehicle;

selecting parking positions which are different in the parking lot and in which moving routes from the entrance of the parking lot to the parking positions do not interfere with movement and parking of other vehicles in the parking lot and do not overlap moving routes of other vehicles in the parking lot for the plurality of vehicles, the other vehicles including a second vehicle; and transmitting the selected parking positions and the moving routes to the parking positions to the plurality of vehicles; wherein while the second vehicle is guided on a second moving route, the first vehicle is guided on a first moving route that does not overlap the second moving route from a position after the entrance of the parking lot up to and including a selected parking position for the first vehicle.

* * * * *